(12) United States Patent  
Bierhoff

(10) Patent No.: US 7,334,241 B2  
(45) Date of Patent: Feb. 19, 2008

(54) DISK DRIVE UNIT HAVING A LOADING MECHANISM

(75) Inventor: Waltherus Cornelis Jozef Bierhoff, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 154 days.

(21) Appl. No.: 10/556,117

(22) PCT Filed: May 6, 2004

(86) PCT No.: PCT/IB2004/050608

§ 371 (c)(1),  
(2), (4) Date: Nov. 8, 2005

(87) PCT Pub. No.: WO2004/100167

PCT Pub. Date: Nov. 18, 2004

(65) Prior Publication Data

US 2007/0067781 A1     Mar. 22, 2007

(30) Foreign Application Priority Data

May 12, 2003   (EP) ................................ 03101316

(51) Int. Cl.  
*G11B 33/02*     (2006.01)

(52) U.S. Cl. ..................................... 720/612

(58) Field of Classification Search ................ 720/612; 369/30.33, 30.95, 37.01  
See application file for complete search history.

(56) References Cited

U.S. PATENT DOCUMENTS

| | | | | |
|---|---|---|---|---|
| 6,754,142 B2* | 6/2004 | Ishida et al. | ............. | 369/37.01 |
| 2003/0002401 A1* | 1/2003 | Mizuno | ................... | 369/30.95 |
| 2003/0193848 A1* | 10/2003 | Lee | .......................... | 369/30.33 |
| 2004/0098735 A1* | 5/2004 | Kim et al. | .................. | 720/612 |

FOREIGN PATENT DOCUMENTS

JP         2001-222845        8/2001

* cited by examiner

*Primary Examiner*—Tianjie Chen  
(74) *Attorney, Agent, or Firm*—Michael E. Belk

(57) ABSTRACT

A disk drive unit having a disk loading mechanism, for use in a mobile device. The loading mechanism is arranged for receiving a disk (A) through an opening in a housing of the device and bringing it into engagement with the disk drive, and vice versa. It comprises a tray (8) which is movable with respect to the housing and the disk drive between a first position for receiving a disk and a second position covering the opening and allowing the disk drive to engage the disk. The tray is rotatable about an axis (10) which substantially coincides with the drive axis (11) when in its driving position. This arrangement results in a slot loader having a tray which will hardly project outside the housing, resulting in a robust loading mechanism.

13 Claims, 3 Drawing Sheets

DISK DRIVE UNIT HAVING A LOADING MECHANISM

BACKGROUND OF THE INVENTION

The present invention relates to a disk drive unit, such as an optical disk drive unit, having a disk loading mechanism, and in particular to a disk drive unit comprising:

a housing having an opening in a wall thereof for inserting or removing a disk into or from the housing;

a disk drive accommodated in the housing and adapted to engage and rotate a disk around a drive axis in order to allow a head to read data from and/or write data on a disk; and a loading mechanism for receiving a disk through the opening in the housing and bringing it into engagement with the disk drive, and vice versa, said loading mechanism comprising:

a tray which is movable with respect to the housing and the disk drive between a first position for receiving a disk and a second position allowing the disk drive to engage the disk.

Disk drive units having a disk loading mechanism are widely spread, particularly in audio, video and computer devices. Most of these devices are stationary devices. The disk loading mechanisms of these stationary devices include a slide in the form of a drawer having a first position projecting from the housing so as to enable a disk to be placed on the drawer, and a second position in which the drawer has been retracted to close the opening and to allow the disk drive to rotate the disk. An example of such a disk loading mechanism is disclosed in DE-A-34 43 070.

Another type of loading mechanism is known from JP 2001-222845. In this loading mechanism for a disk drive unit, the tray is rotatable about an axis in order to rotate the tray between a position within the housing and covering the opening and a position in which it projects from the housing. In this latter position, a disk can be placed onto the tray after which the tray may be rotated back into the housing. As the disk loading mechanisms as described are relatively fragile, these mechanisms are not very well suited for mobile applications, particularly in miniature devices. Then a tray of such a small device would be even more delicate, while there is also more risk of damage due to the transport and handling of such mobile devices, such as telephones and the like.

SUMMARY OF THE INVENTION

It is therefore an object of the present invention to provide a new disk drive unit having an improved disk loading mechanism.

To obtain this object, the invention provides a disk drive unit in which the tray is rotatable about an axis which substantially coincides with the drive axis when in its driving position.

Due to the features of the invention, the tray can be made such that it will remain substantially within the housing when it is rotated to its first position. This will create a so-called slot loader in which the disk is inserted into a slot opening instead of being placed on a outwardly projecting tray. As a result, the tray will not or hardly project perpendicularly away from the housing in its first, opening position, thereby reducing the risk of damage to the tray. This makes the disk drive unit more suitable for use in mobile and/or hand-held devices. Another advantage is that the loading mechanism is less dependent on the correct orientation of the tray when the disk is being inserted, as is the case when the disk must be placed onto the tray. Preferably, the tray covers the opening in the wall of the housing in the second position.

In the embodiment according to claim 2, a simple means is created for closing the opening in the housing. The rotational movement of the tray will automatically move the covering edge between the open and closed position.

The feature of claim 3 has the advantage that the covering edge and the housing are adapted in their shape to the rotational movement of the tray. Furthermore it makes it possible to use the covering edge and the wall of the housing to guide the rotational movement of the tray, as claimed in claim 4. This obviates the need for a central axis for the tray to guide the rotational movement thereof.

Preferably, the disk drive unit according to the invention is integrated in a portable, handheld device, such as a mobile telephone or the like as defined in claim 10. Furthermore, it is preferred to use the disk drive unit with a disk which is contained in an openable cartridge, wherein the unit comprises at least a member for positioning and/or opening the cartridge.

The invention also relates to a cartridge for use with the disk drive unit according to the invention as is defined in claim 12. With such a cartridge, the rotational movement of the tray from the first to the second position can be used to open the cartridge to allow the head of the disk drive unit to access the disk.

To assist the user in inserting the cartridge in a substantially correct manner, it is advantageous to use the feature of claim 13.

Further details and advantages of the invention will be explained in the following description of the Figures in the drawing schematically showing an embodiment of the invention by way of example.

DESCRIPTION OF A PREFERRED EMBODIMENT

Figure 1:
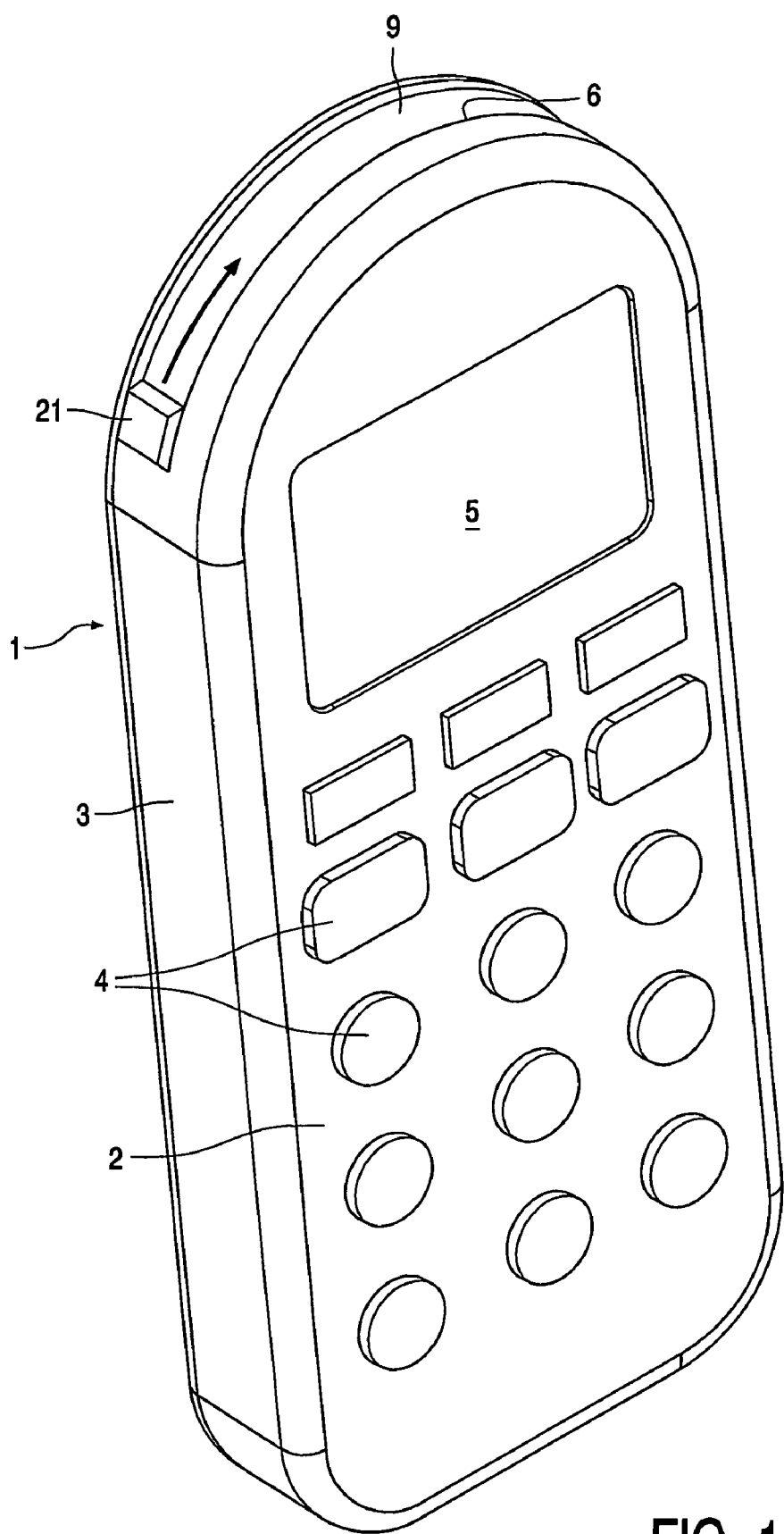
FIG. 1 is a schematic perspective view of a portable device, in particular a mobile phone comprising an embodiment of the disk drive unit according to the present invention.
Figure 2:
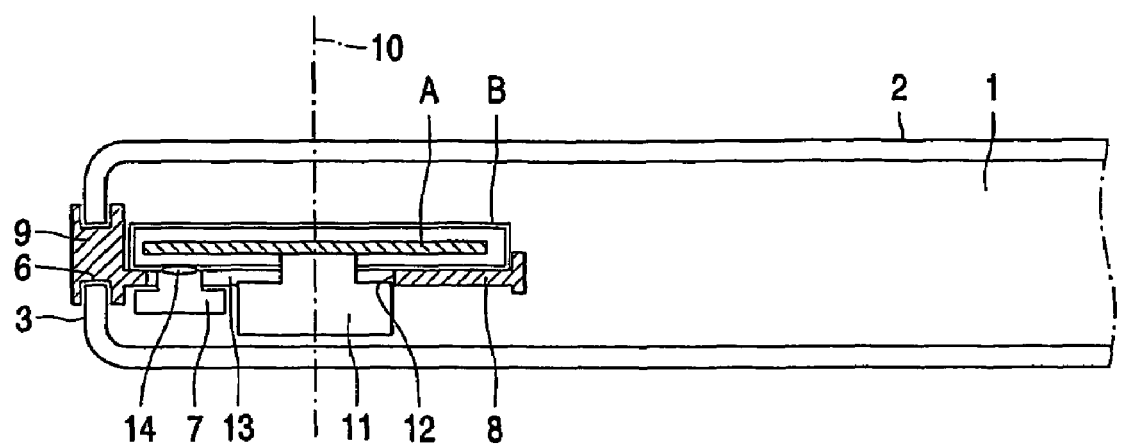
FIG. 2 is a very schematic longitudinal sectional view of the device of FIG. 2.

The drawings, and in particular FIGS. 1 and 2 thereof, show an electronic mobile device, such as a mobile phone, a PDA or the like, incorporating the embodiment of the disk drive unit according to the invention. The device/disk drive unit comprises a housing 1 comprising inter alia a front wall 2, a circumferential wall 3, and operating keys 4 and a display 5 in the upper wall 2.

In this case the upper side of the circumferential wall is semi-cylindrical in shape and has a closable slot-like opening 6 which is intended for inserting a disk A into the housing 1 in order to use it in a disk drive 7 contained in the housing 1.

In the embodiment shown, the disk A is preferably an optical disk which is contained in a cartridge B to protect the disk against dust, scratches, or any other environmental influences which may affect the operation of the disk A.

However, the invention is also suitable for co-operation with a disk, optical or non-optical, without cartridge.

A loading mechanism of the disk drive unit comprises a tray 8. The tray 8 is adapted to receive a disk A or the disk cartridge B therein through the opening 6 in the circumferential housing wall 3. The tray is equipped with a substantially semi-cylindrical covering edge 9, extending around almost half the circumference of the tray 8. In this case the circumference of the tray 8 is circular, but it may deviate from this shape, especially in the area outside the covering edge 9. The tray 8 is rotatable with respect to the housing 1 and the disk drive 7 between a first position, in which the covering edge 9 of the tray 8 is substantially moved away from the opening 6 in the housing wall 3 so as to allow insertion or removal of a disk cartridge B into or out of the housing 1, and a second position, in which the covering edge 9 of the tray 8 is aligned with the opening 6 and therefore closes the opening 6 in the housing.

During its rotation, the tray 8 rotates about an axis 10 which coincides with an axis of a drive shaft 11 of the disk drive 7. In this embodiment, the axis of rotation 10 coincides with the center of curvature of the covering edge 9. This makes it possible to use the engagement between the covering edge 9 and the edge of the opening 6 as a guide for the rotational movement of the tray 6. Of course the guide should be extended into the housing 1 to also guide the tray in the open position. Additional or alternative guides or bearings for the rotation of the tray 9 are conceivable. The covering edge 9 preferably also seals the opening 6 against the penetration of dust. It may, for example, form a labyrinth seal with the edge of the opening 6.

Figure 3:
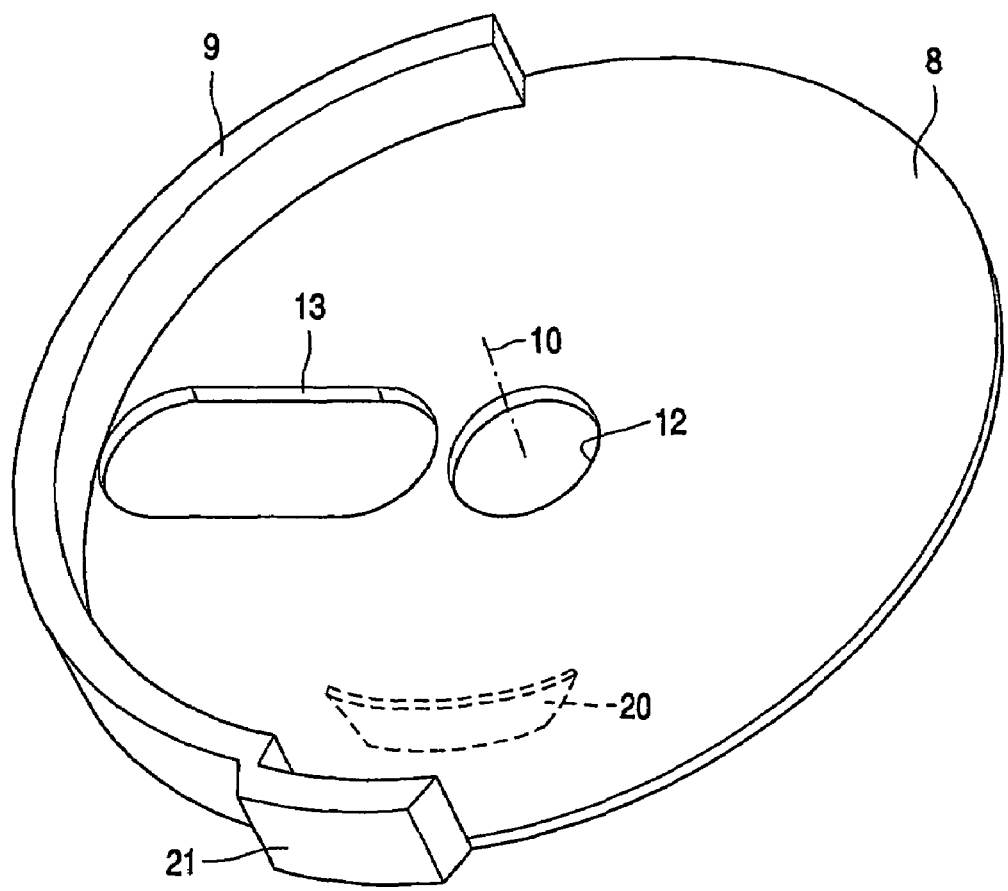
FIG. 3 is an enlarged perspective view of the tray from the device of FIG. 1.

Referring in particular to FIG. 3, the bottom of the tray 8 has in its center a hole 12 to allow co-operation of the disk drive 5 and the disk A, in particular to allow engagement between the drive shaft 11 and a hole in the disk A, and also has an access opening 13 to allow a read/write head 14 of the disk drive 7 to co-operate with the surface area of disk A designed for this.

Figure 4:
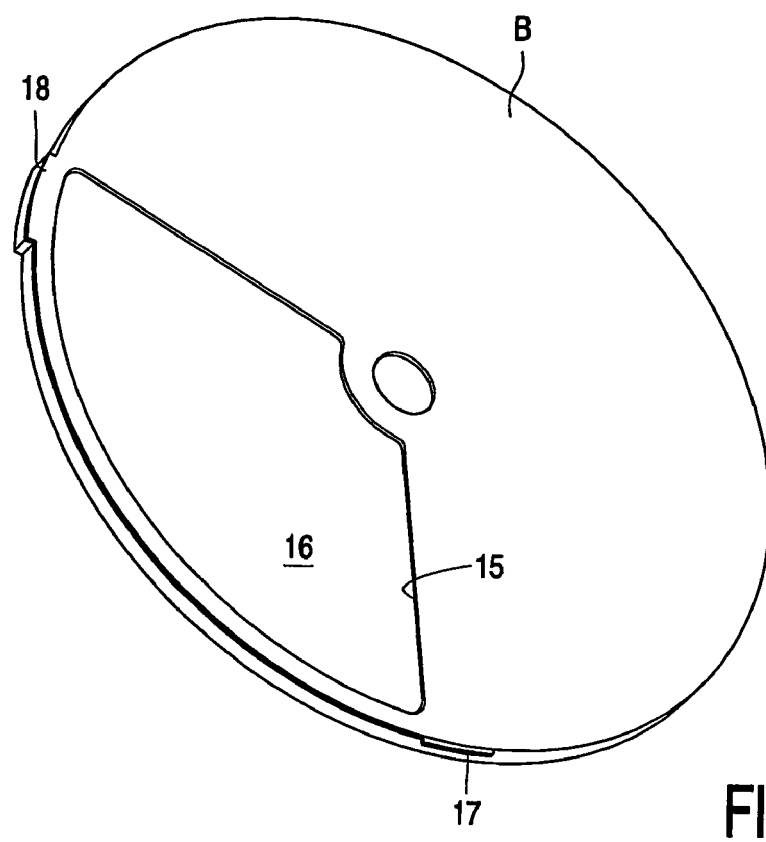
FIGS. 4 and 5 are perspective views of a disk cartridge for use in the device of FIGS. 1 to 3, as viewed from two sides.
Figure 5:
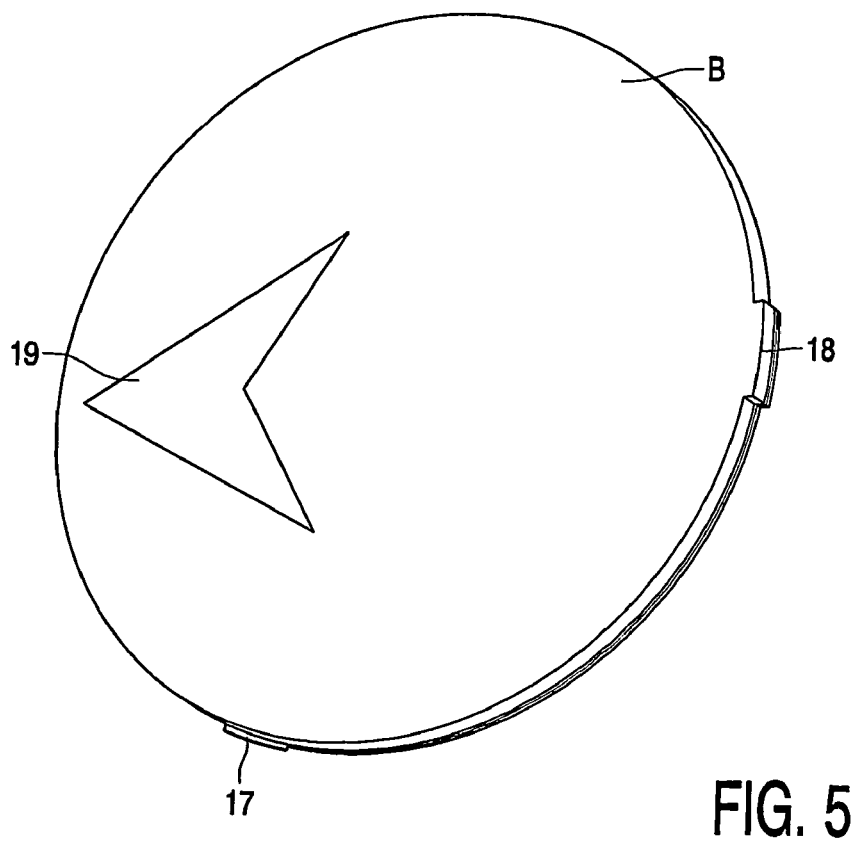

For this purpose, and as is shown in FIG. 4, the cartridge B also has an access opening 15 which is closable by some kind of closure, in this case a slide 16. The disk drive 7 may be provided with means for opening or closing the cartridge, in this case consisting of a member co-operating with a projection 17 on the circumference of the slide 16. The cartridge B is further provided with a member 18 for positioning and locking the cartridge B to the tray 8 so that, if the tray 8 is rotated, the cartridge will rotate along with the tray 8, and the slide 16 will be kept stationary with respect to the housing 1. This will cause an opening and closing movement of the slide 16 with respect to the cartridge B. To facilitate a correct placement of the disk cartridge B with respect to the tray 8, that is in a position in which the access opening 15 in the cartridge B and the access opening 13 in the tray 8 are aligned, an indication 19, such as an arrow (see FIG. 5), may be provided on the cartridge B. The cartridge B may further comprise guiding members to guide the cartridge B to a correct position on the tray 8, and means for preventing an upside-down placement of the cartridge B on the tray 8.

As usual, means may be provided for positioning the cartridge in the disk drive and for detecting a correctly positioned cartridge. Furthermore, the disk drive may comprise means for locking the slide 6 in the second position as long as the motor of the disk drive is rotating. The tray 8 may also comprise means for creating a relative movement between the tray 8 and the drive shaft 11 so as to bring the drive shaft into and out of engagement with the hole in the disk A. This means may include a ramp or cam 20 on the lower side of the tray 8. However, it is also conceivable that the drive shaft is movable. In that case, the tray preferably comprises an operating member to switch the control of said movement of the drive shaft 11. Such switches and members on the tray may be provided at the circumference or at the bottom of the tray 8.

The rotation of the tray 8 may be carried out by means of a motor, or in a more simple embodiment by hand. In the example shown in the drawing, an operating knob 21 is provided at one end of the covering edge 9. This operating knob projects through the opening 6 and is accessible by hand at any time, so that it is possible to open or close the opening 6 by gripping the knob 21 and moving it relative to the housing 1.

It is conceivable to provide the tray 8 or the housing 1 with an ejection mechanism acting upon the cartridge B during opening of the tray 8 in order to bring the cartridge B at least partially outside the housing 1, where it can be gripped by the user. The ejection mechanism may be activated by the tray 8 which is, for example, moved beyond its open position against the pressure of a spring force. The ejection mechanism may be tensioned again by pushing a cartridge B into the housing 1 or by moving the tray 8 to the closed position.

It will be clear from the above that the invention provides a disk drive unit and a device having a simple, reliable, robust and compact loading mechanism, which is easy to operate and is sealed effectively in the closed position.

The invention is not restricted to the above-described embodiment as shown in the drawing, which may be varied in several ways without departing from the scope of the invention. The disk may be an optical disk, such as a CD or DVD, a magneto-optical disk, or a magnetic disk. The disk may be readable/writable by means other than optical means, such as magnetic means or other means. The tray may be guided in another way, and the axis of rotation of the tray may also be slightly offset with respect to the axis of the drive shaft. The shape of the tray may be such that it projects somewhat from the opening in the housing in the loading position thereof, if required by the circumstances. The disk drive may also be adapted to co-operate with a disk without a cartridge.

In general it is noted that, in this application, the expression "comprising" does not exclude other elements, and "a" or "an" does not exclude a plurality. A single processor or unit may fulfil the functions of several elements in the appended claims. Reference signs in the claims shall not be construed as limiting the scope thereof.

The invention claimed is:

1. A disk drive unit having a disk loading mechanism, comprising:
    a housing (1) having an opening (6) in a wall (3) thereof for inserting or removing a disk (A) into or from the housing,
    a disk drive (7) accommodated in the housing and adapted to engage and rotate a disk (A) about a drive axis (11) of the disk drive in order to allow a head (14) to read data from and/or write data on a disk,
    a loading mechanism for receiving a disk through the opening in the housing and bringing it into engagement with the disk drive, and vice versa, said loading mechanism comprising:
    a tray (8) which is movable with respect to the housing and the disk drive between a first position for receiving a disk and a second position allowing the disk drive to engage the disk, wherein the tray is rotatable about an axis (10) which substantially coincides with the drive axis (11) when in its driving position.

2. The disk drive unit of claim 1, wherein the tray (8) is provided with a covering edge (9) adapted to cover the opening (6) in the housing (1) in its second position, and wherein preferably the tray is positioned substantially within the housing, both in the first and in the second position.

3. The disk drive unit of claim 2, wherein the covering edge (9) of the tray (8) and the wall (3) of the housing (1) surrounding the opening (6) are cylindrical.

4. The disk drive unit of claim 3, wherein the covering edge (9) is guided by the wall (2, 3) of the housing (1) alongside the opening (6).

5. The disk drive unit of claim 1, wherein the tray (8) has a closable access opening (13) to allow a read and/or write head (14) of the disk drive (7) to gain access to the disk, and has a hole (12) to allow the disk drive (7) to engage the disk through the tray in order to drive it.

6. The disk drive unit of claim 1, wherein the tray (8) is manually rotatable and is provided with an operating knob (21) near its circumference, which knob is accessible and operable from outside the housing.

7. The disk drive unit of claim 6, wherein the operating knob (21) projects through the disk insertion opening (6) in the housing (1).

8. The disk drive unit of claim 1, wherein the unit is provided with an ejection mechanism acting upon a cartridge (B) when the tray (8) is opened in order to bring the cartridge (B) at least partially outside the housing (1).

9. The disk drive unit of claim 1, wherein the tray (8) is provided with at least one member (20) for co-operating with an associated member in the housing (1) to operate a mechanism during rotation of the tray.

10. The disk drive unit of claim 1, integrated in a portable, hand-held device.

11. The disk drive unit according to claim 1, intended to be used with a disk (A) contained in an openable cartridge (B), the unit comprising at least a member for positioning and/or opening the cartridge.

12. A cartridge for use with the disk drive unit according to claim 11, wherein the cartridge comprises a closable access opening (15) and at least a positioning member (18) for positioning the access opening (15) in the cartridge (B) relative to an access opening (13) in the tray (8).

13. The cartridge of claim 12, wherein the cartridge (B) is provided with an indication (19) providing information to the user about the correct position with respect to the tray (8).

* * * * *